United States Patent Office 2,910,316
Patented Oct. 27, 1959

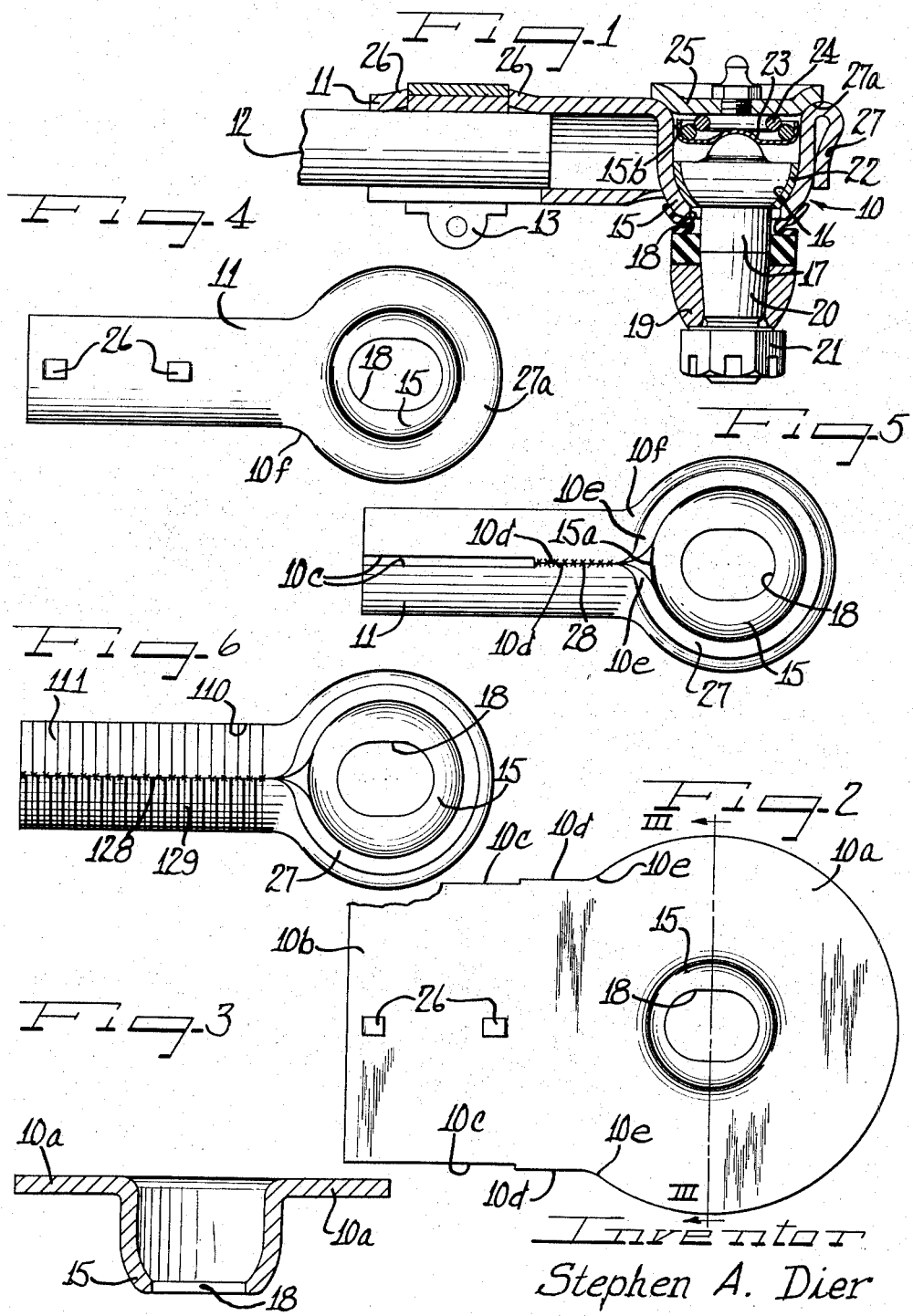

2,910,316

STAMPED SOCKET ASSEMBLY

Stephen A. Dier, Detroit, Mich., assignor to Thompson Ramo Wooldridge Inc., a corporation of Ohio Application July 21, 1955, Serial No. 523,565

10 Claims. (Cl. 287—90)

The present invention relates to improvements in the construction of joints for connectors and, more particularly, is concerned with the provision of an improved joint housing constructed of stamped sheet metal.

As those skilled in the art of manufacturing ball and socket type joints commonly used in the automotive industry for steering linkages and other similar link systems are aware, cost has been an important factor in the success or failure of improved structures. Reductions in cost may be achieved through a minimization of materials, an increase in the speed of manufacture, a reduction in the amount of special equipment necessary, reduction in the number of total parts, and other similar ways. Most of the prior art joints and joint housings that have met with substantial commercial success and have been important advances in the art, have accomplished such a saving in cost through one or more of the above methods. However, to my knowledge, none of the prior art improved structures has embodied a sheet metal construction stamped to provide a rigid joint housing structure having strength as great as those housings heretofore known while achieving a reduction in cost through substantially all of the avenues of cost reduction above noted.

In accordance with the present invention, a joint housing is constructed of sheet metal initially taking the form of a keyhole shaped blank. This blank is initially cupped substantially at the center of the circular portion of the keyhole to provide an upwardly dished segmental spherical bearing socket. After the initial cupping operation the peripheral area of sheet material surrounding the cup portion is upwardly flanged to provide a cup reinforcing side wall and the extended part of the keyhole shaped blank is rolled to provide a securing stem by which the socket may be clamped or threaded to a supporting member. The sheet metal housing thus formed is subsequently provided with a ball stud having a segmental spherical surface seated within the socket above described and an extending threaded portion for cooperation with the second supporting member.

Through the use of sheet metal for the manufacture of the housing, and by constructing the housing with an initially cupped socket surface with a reversely formed rigidifying supporting wall or flange, an extremely strong unit is provided. At the same time, the costs involved in the handling and stamping of the sheet metal are less than the costs ordinarily involved in the manufacture of ball joint housings from forgings. Further, as those skilled in the art are aware, the use of solid forgings for joint housings requires an amount of metal substantially in excess of that needed to supply the requisite safety. As a result of the present construction, hereinafter more fully set forth, a hollow sheet metal stamping is provided which, through its particular construction, provides ample rigidity and at the same time eliminates a large portion of the weight of the unit. Since relatively light weight materials are utilized it has been found possible to manufacture the joint of the present invention on conventional sheet metal pressing equipment in a cold state thereby eliminating the need for heavy duty upsetting equipment as well as heating equipment for raising the temperature of billet steel to a satisfactory forging level.

Accordingly, it is an object of the present invention to provide an improved joint housing constructed of stamped sheet metal.

Another object of the present invention is to provide a light weight joint housing constructed of stamped, self-reinforced, sheet metal.

Yet a further object of the present invention is to provide a sheet metal joint housing of an exceedingly rigid construction wherein all the parts, including the supporting stem are hollow.

A feature of the invention is the construction of a housing with a reversely stamped self-reinforcing socket portion at one end thereof.

A further object of the present invention is to provide a novel method of manufacturing an inexpensive joint socket capable of withstanding heavy duty use and whereby the socket may be manufactured without forging or other manufacturing steps requiring the presence of heat.

Still other and further objects and features of the present invention will at once become apparent to those skilled in the art from a consideration of the attached drawings wherein two preferred embodiments are shown by way of illustration only and wherein:

Figure 1 is a side elevational view in cross-section of an assembled joint constructed in accordance with the principles of the present invention;

Figure 2 is a plan view of a sheet metal blank after an initial cupping operation has been performed thereon;

Figure 3 is a cross-sectional view taken along line III—III of Figure 2;

Figure 4 is a plan view of a finished housing formed from the blank shown in Figure 2;

Figure 5 is a bottom view of the housing shown in plan in Figure 4; and

Figure 6 is a bottom view of a modified form of housing constructed in accordance with the principles of the present invention.

As shown in the drawings:

As may be seen from a consideration of Figure 1, the present joint comprises a housing generally indicated at 10 having a substantially tubular extension 11 for cooperation with a first support member 12 to which it is clamped by means of a conventional C type clamp 13. The housing 10 further comprises a socket portion 15 which cooperates with a segmental spherical bearing surface 16 on a stud 17. The stud 17 projects through an aperture 18 in the socket 15 for cooperation with a second support or joint member 19 conventionally secured to the stud 17 at the tapered portion 20 thereof by means of a castellated nut 21 and a conventional cotter pin. The joint may, if desired, be provided with an intermediate bearing liner 22 for reducing the friction of the joint and is provided with a pressure plate 23 and spring 24 acting against a bottom plate 25 for maintaining the stud in its seated position shown in Figure 1.

The housing 10 of the assembled joint described above is preferably formed from a substantially keyhole shaped blank shown in Figure 2. This blank has a generally circular portion 10a and an extending generally rectangular portion 10b. Small cut-out portions 10c are provided for reasons which will be more fully described below. As an initial step in the manufacture of the housing, the blank is trimmed to provide an outer configuration as shown in Figure 2. Subsequent to, or simultaneous with, this initial cutting or shearing operation, a socket portion 15 of cupped configuration is formed at the central portion of the area designated 10a. Socket portion 15 defines a stud passing aperture 18 of conventional configuration and which is here shown to be somewhat elongated in order to permit a greater degree of stud pivot along the axis of the member 12 than along the longitudinal axis of the member 19. At the same time the aperture 18 is pierced, which is preferably simultaneously with the cupping of the socket 15, fingers 26 are pierced from the blank. These fingers cooperate with the clamp 13 in the manner shown in Figure 1 and retain the clamp in its position on the extension 11.

Subsequent to the operation by which the plain blank is deformed into a cupped shape as shown in Figures 2 and 3, the peripheral surface surrounding the socket 15, and forming the generally circular portion 10a, is flanged downwardly and around the socket 15 to form a socket reinforcing wall 27. Preferably during this operation the rectangular portion of the blank, 10b, is rolled into a tubular form providing an extension 11 with portions 10d abutting each other and the portions 10c providing a relieved area defining a slot. It will be understood that the term "rolling" as here used, includes the deflection of the blank into a round shape by means of a series of sequential stamping operations as well as the method of deforming the sheet metal into a curve around a central core which is removed after the forming operation.

Immediately after the tubular extension 11 has been rolled and the reinforcing wall 27 has been completed, the abutting portions 10d are welded as at 28. While it has been found that the reinforcing effect of the reversely formed flange wall 27 provides satisfactory rigidity in the joint housing for most uses, it will be understood that for certain heavy duty installations it may be desired that the weld 28 extend to the immediately adjacent portion of the socket 15a thereby integrating the abutment portions 10d, the transitional portions 10e between the portions 10d and the central portion 10a, and the socket portion 15a into a rigid unit. As will be apparent, this additional weld requires the addition of a small amount of welding rod material when the blank shown in Figure 2 is utilized. If it is desired that such an additional weld be provided, it is within the scope of the present invention to provide a small projection at the point 10e on each side of the blank between the portions 10b and the central portion 10a so that the reinforcing wall 27 will completely surround the socket 15 and meet, with the above mentioned small projections in abutment, for welding as a continuation of the weld 28.

Subsequent to the welding step by which the abutment surfaces 10d are secured to each other, the joint parts are assembled in the manner illustrated in Figure 1 and the closure gap 25 is welded, either by spot or pressure welding to the base 27a of the reinforcing wall 27. While the closure plate 25 is shown as welded to the housing 10 it will be understood that it may, alternatively, be provided with peripheral threads for engagement with internally facing threads on the inner wall portion 15b of the socket.

A modified form of the joint housing is illustrated in Figure 6. As there shown, a housing 110 is provided with a socket 15 having an aperture 18 and reversely formed reinforcing wall 27 substantially identically to the structure shown in Figures 1 through 5. However, instead of providing cut away portions 10c, the rectangular portion of the initial blank is retained without the notched cutouts and is welded throughout its entire length, as at 128. The completely tubular surface is then externally threaded for cooperation with an internally threaded tubular member such as for example an internally threaded adjusting sleeve commonly used in the drag link connections of modern vehicles. In the embodiment shown in Figure 6, the pierced clamp retaining fingers are, of course, eliminated to provide a smooth external threaded surface 129 throughout the tubular extending portion 111.

As a result of the structural relationships set forth and described, a joint of unusual rigidity is provided while at the same time no surplus metal is utilized. Actually, it has been found that the major stress as applied to joint housings, such as the ball joint housing herein illustrated, act upon the surface of the metal. Accordingly, by providing a sheet metal housing, the surface of the housing is not essentially changed from the surface of conventional forged, solid housings. Additionally, while the external surface is substantially the same, the reversely formed cupped socket 15 and wall 27 cooperating together, provide a self-reinforcing combination having unusual strength. Further, the merging of the wall surface 27 into the tubular portion 11 provides a rigidifying transitional area 10f. It will thus be seen that I have provided a satisfactory housing exclusively from sheet metal without in any sense sacrificing the strength and rigidity absolutely necessary in the steering systems of modern vehicles. Since the housing is constructed exclusively of sheet metal, the material need not be heated during the stamping steps and, further, unusually heavy machinery is unnecessary. As a result of the substantial reduction in over-all weight of material used and the simpler manufacturing steps available, it will be clear that the manufacturing cost of the improved joint hereinabove described is substantially lower than the cost of joints heretofore known. It is understood that variations and modifications, other than those hereinabove set forth, may be made in accordance with the principles of the present invention without departing from the scope of the novel concepts thereof. Accordingly, it is my intention that the scope of the present invention be limited solely by that of the hereinafter appended claims.

I claim as my invention:

1. A stamped metal joint comprising a sheet metal housing and a segmental spherical stud, said housing comprising a circumferentially continuous cupped socket portion having a base extending into an integral flanged wall extending outwardly and downwardly into reinforcing abutting engagement with the outer surface of said socket portion, said wall and said socket merging into an integral tubular extension for securing said housing to a support member, said stud having a segmental spherical bearing surface for cooperation with the inner surface of said socket portion and a shank portion for securing said stud to a second support member.

2. A stamped metal joint comprising a sheet metal housing and a segmental spherical stud, said housing comprising a circumferentially continuous cupped socket portion having a base extending into an integral flanged wall extending outwardly and downwardly into reinforcing abutting engagement with the outer surface of said socket portion, said wall and said socket merging into an integral tubular extension for securing said housing to a support member, said stud having a segmental spherical bearing surface for cooperation with the inner surface of said socket portion and a shank portion for securing said stud to a second support member, and retaining means for securing the segmental spherical portion of said stud in said socket.

3. A stamped metal joint comprising a sheet metal housing and a segmental spherical stud, said housing comprising a circumferentially continuous cupped socket portion having a base extending into an integral flanged wall extending outwardly and downwardly into reinforcing abutting engagement with the outer surface of said socket portion, said wall and said socket merging into an integral tubular extension for securing said housing to a support member, said stud having a segmental spherical bearing surface for cooperation with the inner surface of said socket portion and a shank portion for securing said stud to a second support member, said socket portion having an aperture therein for the passage of said stud shank prior to securement of the latter to said second support member whereby said stud and said housing are secured together.

4. The method of manufacturing a joint housing comprising the steps of forming a keyhole shaped blank of sheet metal, cupping the center of the circular portion of said keyhole shaped blank, flanging the periphery of said circular portion outwardly and downwardly into abutting engagement with said cupped center outside the periphery thereof and rolling the rectangular portion of the keyhole shape into a tube having a longitudinal axis substantially perpendicular to the axis of cupping.

5. A sheet metal joint housing comprising a tube, means at one end of said tube for securing said tube to a first support member, a circumferentially continuous socket at the other end of said tube and comprising a segmental spherical wall integral with said tube and having an axis transverse to the axis of said tube, said socket being deflected from the wall of the tube inwardly toward the axis of said tube and extending across said other end of said tube.

6. A sheet metal joint housing comprising a tube, means at one end of said tube for securing said tube to a first support member, a circumferentially continuous and integral socket at the other end of said tube and comprising a segmental spherical wall integral with said tube and having an axis transverse to the axis of said tube, said socket being deflected from the wall of the tube inwardly toward the axis of said tube, and a reinforcing wall surrounding said socket in abutting engagement therewith and integral with said tube and said socket.

7. A sheet metal joint housing comprising a tube, means at one end of said tube for securing said tube to a first support member, a circumferentially continuous and integral socket at the other end of said tube and comprising a segmental spherical wall integral with said tube and having an axis transverse to the axis of said tube, said socket being deflected from the wall of the tube inwardly toward the axis of said tube, and a reinforcing wall surrounding said socket in abutting engagement with said socket and integral with said tube and said socket, said socket having an aperture pierced therethrough for the passage of a stud and a closure plate rigidly secured across the face of said segmental spherical wall for maintaining said stud within said socket.

8. A sheet metal joint housing comprising a tube, means at one end of said tube for securing said tube to a first support member, a circumferentially continuous socket at the other end of said tube and comprising a segmental spherical wall integral with said tube and having an axis transverse to the axis of said tube, said socket being deflected from the wall of the tube inwardly toward the axis of said tube, and a reinforcing wall surrounding said socket in abutting engagement therewith and integral with said tube and said socket, said tube having a longitudinally extending slot extending a portion thereof from said one end toward said other end whereby said tube may be collapsed in clamping engagement with said first support member.

9. A sheet metal joint housing comprising a tube, means at one end of said tube for securing said tube to a first support member, a circumferentially continuous socket at the other end said tube and comprising a segmental spherical wall integral with said tube and having an axis transverse to the axis of said tube, said socket being deflected from the wall of the tube inwardly toward the axis of said tube, and a reinforcing wall surrounding said socket in abutting engagement with said socket and integral with said tube and said socket, said tube having external threads thereon for cooperation with internal threads of said first support member.

10. A stamped sheet metal joint housing comprising a keyhole shaped sheet metal blank having an upwardly cupped circumferentially continuous socket in the central area of the round portion of the keyhole shape and an outwardly and downwardly formed reinforcing wall formed by the peripheral edge of said round portion extending in abutting relation to said socket, the rectangular portion of said blank being formed into a tube for securing said joint housing to a support member and said reinforcing wall having a portion thereof extending in integral, continuous relation with said tube.

References Cited in the file of this patent

UNITED STATES PATENTS

| | | |
|---|---|---|
| 298,224 | Morgan | May 6, 1884 |
| 1,656,426 | Cunningham | Jan. 17, 1928 |
| 1,842,747 | Crawford et al. | Jan. 26, 1932 |
| 1,902,241 | Jones | Mar. 21, 1933 |
| 2,069,480 | Riemenschneider et al. | Feb. 2, 1937 |
| 2,236,062 | Katcher | Mar. 25, 1941 |
| 2,274,417 | Katcher | Feb. 24, 1942 |
| 2,696,397 | Booth | Dec. 7, 1954 |
| 2,748,464 | Kaul | June 5, 1956 |

FOREIGN PATENTS

| | | |
|---|---|---|
| 657,849 | Germany | Mar. 14, 1938 |